US010133660B2

(12) United States Patent
Ostrovsky et al.

(10) Patent No.: US 10,133,660 B2
(45) Date of Patent: *Nov. 20, 2018

(54) DYNAMICALLY ALLOCATED THREAD-LOCAL STORAGE

(71) Applicant: Microsoft Technology Licensing, LLC, Redmond, WA (US)

(72) Inventors: Igor Ostrovsky, Redmond, WA (US); Joseph E. Hoag, Kenmore, WA (US); Stephen H. Toub, Seattle, WA (US); Mike Liddell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/168,621

(22) Filed: May 31, 2016

(65) Prior Publication Data
US 2016/0275010 A1 Sep. 22, 2016

Related U.S. Application Data

(63) Continuation of application No. 13/165,421, filed on Jun. 21, 2011, now Pat. No. 9,354,932.

(51) Int. Cl.
*G06F 12/02* (2006.01)
*G06F 9/50* (2006.01)
*G06F 3/06* (2006.01)

(52) U.S. Cl.
CPC .......... *G06F 12/023* (2013.01); *G06F 3/061* (2013.01); *G06F 3/0608* (2013.01);
(Continued)

(58) Field of Classification Search
CPC .............. G06F 9/5016; G06F 12/0804; G06F 12/0817; G06F 12/0815; G06F 8/443;
(Continued)

(56) References Cited

U.S. PATENT DOCUMENTS 6,345,313 B1 * 2/2002 Lindholm ............. G06F 9/5016
719/315
6,401,121 B1 6/2002 Yoshida et al.
(Continued)

OTHER PUBLICATIONS

Drepper, Ulrich, "ELF Handling for Thread-Local Storage", Retrieved at <<http://dev.gentoo.org/~dberkholz/articles/toolchain/tls.pdf>>, Intel Itanium Processorspecific Application Binary Interface, Feb. 8, 2003, pp. 1-79.
(Continued)

*Primary Examiner* — Lewis A Bullock, Jr.
*Assistant Examiner* — Kevin X Lu
(74) *Attorney, Agent, or Firm* — Dicke, Billig & Czaja, PLLC

(57) ABSTRACT

Dynamically allocated thread storage in a computing device is disclosed. The dynamically allocated thread storage is configured to work with a process including two or more threads. Each thread includes a statically allocated thread-local slot configured to store a table. Each table is configured to include a table slot corresponding with a dynamically allocated thread-local value. A dynamically allocated thread-local instance corresponds with the table slot.

20 Claims, 6 Drawing Sheets

(52) U.S. Cl.
CPC .......... *G06F 3/0631* (2013.01); *G06F 3/0673* (2013.01); *G06F 9/5016* (2013.01); *G06F 2212/1016* (2013.01); *G06F 2212/1044* (2013.01)

(58) Field of Classification Search
CPC ...... G06F 12/023; G06F 3/0608; G06F 3/061; G06F 3/0631; G06F 3/0673; G06F 2212/1016; G06F 2212/1044
See application file for complete search history.

(56) References Cited

U.S. PATENT DOCUMENTS

| | | |
|---|---|---|
| 6,539,464 B1 | 3/2003 | Getov |
| 6,757,891 B1 | 6/2004 | Azagury et al. |
| 6,820,261 B1 | 11/2004 | Bloch |
| 7,318,127 B2 | 1/2008 | Hrusecky et al. |
| 7,412,710 B2 | 8/2008 | Oliva |
| 7,856,637 B1 | 12/2010 | Clark |
| 7,991,962 B2 | 8/2011 | Finnie et al. |
| 8,126,927 B1 | 2/2012 | Binshtock et al. |
| 9,354,932 B2 | 5/2016 | Ostrovsky et al. |
| 2005/0039186 A1* | 2/2005 | Borkan ............... G06F 11/3476 719/310 |
| 2005/0183078 A1 | 8/2005 | Shi et al. |
| 2006/0031810 A1 | 2/2006 | Peng et al. |
| 2007/0288708 A1* | 12/2007 | Saha .................. G06F 9/30032 711/159 |
| 2009/0037501 A1* | 2/2009 | Nishiyama ............ G06F 12/023 |
| 2009/0150616 A1 | 6/2009 | Finnie et al. |
| 2010/0192139 A1 | 7/2010 | Titzer et al. |
| 2011/0126202 A1* | 5/2011 | Krauss .................. G06F 9/485 718/102 |
| 2012/0331475 A1 | 12/2012 | Ostrovsky et al. |

OTHER PUBLICATIONS

"Thread Local Storage", Retrieved at <<http://msdn.microsoft.com/en-us/library/ms686749(v=vs.85).aspx>>, Retrieved Date: Apr. 4, 2011, pp. 2.

Levin, Adi, "'Adi Levin's Blog for programmers Thread Local Storage", Retrieved at <<http://adilevin.wordpress.com/2009/07/08/thread-local-storage/>>, Jul. 8, 2009, pp. 4.

Oliva, et al., "Speeding Up Thread-Local Storage Access in Dynamic Libraries", Retrieved at <<http://www.lsd.ic.unicamp.br/~oliva/writeups/TLS/paper.pdf>>, Nov. 11, 2005, pp. 1-10.

Unknown Author, "Thread Local Storage", msdn.microsoft.com/en-us/library/windows/desktop/ms686749(v=vs.85).aspx, Jul. 1, 2002.

Unknown Author, "Using Thread Local Storage in a Dynamic Link Library", msdn.microsoft.com/enus/library/windows/desktop/ms686997, 2007.

Omara, "What is Concurrent Bag?", www.emadomara.com/2011/08/what-is-concurrentbag.html, Aug. 11, 2011.

Sundell et al., "A Lock-Free Algorithm for Concurrent Bags", SPAA, Jun. 4, 2011.

Unknown Author, "ConcurrentBag<T>.IEnumerable.GetEnumerator Method", msdn.microsoft.com/enus/library/dd381956(v=vs.1 00).aspx, Jan. 8, 2007.

Unknown Author, "Sparse Array", www.cis.upenn.edu/-matuszek/cit594-2009/Lectures/45-sparse-arrays.ppt, Mar. 1, 2003.

Vlad Answer at Nov. 6, 2010, "C++—Delete Linked List", stackoverflow.com/questions/4112905/delete-linked-list, Nov. 5, 201 0.

Edaqa Mortoray, "Destruction of Static-class members in thread local storage"—2nd answer at Jan. 4, 2011, stackoverflow.com/questions/4592033/destruction-of-static-class-members-in-thread-local-storageJan. 4, 2011.

Reed Copsey, Jr., "Thread specific data becomes easier in .NET 4.0 via ThreadLocakT>", Nov. 12, 2009, reedcopsey .com/2009/11/12/th read-specific-data-becomes-easier-in-net-4-0-via-th readlocalt/.

Rustan et al., A Basis for Verifying Multi-threaded Programs, Programming Languages and Systems, vol. 5502 of the series Lecture Notes in Computer Science, pp. 378-393.

The Office Action for U.S. Appl. No. 13/165,421 dated Mar. 27, 2014 (23 pgs.).

The Final Office Action for U.S. Appl. No. 13/165,421 dated Nov. 7, 2014 (21 pgs.).

The Notice of Allowance for U.S. Appl. No. 13/165,421 dated Feb. 1, 2016 (15 pgs.).

* cited by examiner

DYNAMICALLY ALLOCATED THREAD-LOCAL STORAGE

CROSS-REFERENCE TO RELATED APPLICATIONS

This patent application is a continuation of U.S. patent application Ser. No. 13/165,421 filed Jun. 21, 2011, and issued as U.S. Pat. No. 9,354,932 on May 31, 2016, entitled "DYNAMICALLY ALLOCATED THREAD-LOCAL STORAGE," which is incorporated herein by reference.

BACKGROUND

Computer applications having concurrent threads executed on multiple processing systems (such as multiple processors, multiple processor cores, or other forms or parallelism) present great promise for increased performance but also present great challenges to developers. The growth of raw sequential processing power has flattened as processor manufacturers have reached roadblocks in providing significant increases to processor clock frequency. Processors continue to evolve, but the current focus for improving processing power is to provide multiple processor cores on a single die to increase processor throughput. Sequential applications, which have previously benefited from increased clock speed, obtain significantly less scaling as the number of processing systems increase. In order to take advantage of multiple processing systems, concurrent (or parallel) applications are written to include concurrent threads distributed over the processing systems.

A process includes one or more threads and the code, data, and other resources of a program in memory. Typical program resources are open files, semaphores, and dynamically allocated memory. A thread is basically a path of execution through a program. A thread typically includes a stack, the state of the processor registers, and an entry in the execution list of the system scheduler. Each thread shares resources of the process. A program executes when the system scheduler gives one of its threads execution control. The scheduler determines which threads will run and when they will run. Threads of lower priority might have to wait while higher priority threads complete their tasks. On multiprocessor machines, the scheduler can move individual threads to different processors to balance the workload. Each thread in a process operates independently. Unless the threads are made visible to each other, the threads execute individually and are unaware of the other threads in a process. Threads sharing common resources, however, coordinate their work by using semaphores or another method of inter-process communication.

Thread Local Storage (TLS) is a method by which each thread in a given multithreaded process can allocate locations in which to store thread-specific data and uses static or global memory local to a thread. Typically all threads in a process share the same address space, which is sometimes undesirable. Data in a static or global variable is typically located at the same memory location, when referred to by threads from the same process. Variables on the stack are local to threads, because each thread has its own stack, residing in a different memory location. Sometimes it is desirable that two threads referring to the same static or global variable are actually referring to different memory locations, thereby making the variable thread-local. If a memory address sized variable can be made thread-local, arbitrarily sized memory blocks can be made thread-local by allocating such a memory block and storing the memory address of that block in a thread-local variable.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Thread-local storage is a programming construct that is useful in multi-threaded programming. A thread-local variable has one memory location for each thread, and each thread will be able to see its own value when accessing the variable. One example scenario where thread-local variables are useful is a two-phase program where each thread first computes a partial result, and then the partial results are combined into a final answer. The thread-local storage can be exposed in a platform with a ThreadStatic attribute. A limitation of ThreadStatic attribute is that each thread-local variable is defined in the program source code and not allocated and released dynamically depending on the input.

The present disclosure is directed to dynamically allocated thread storage in the memory of a computing device. Dynamically allocated thread storage is configured to work with a process including two or more threads. Each thread includes a statically allocated thread-local slot configured to store a table. Each table is configured to include a table slot corresponding with a dynamically allocated thread-local value. A dynamically allocated thread-local instance corresponds with the table slot. Dynamically allocated thread-local slots are implemented on top of statically allocated thread-local slots.

This implementation has several advantages over thread-local variables. For example, the implementation provides for faster reads and writes of thread-local variables. Additionally, the implementation can conserve computer memory. Further, the implementation enables enumeration of the values of all threads for a particular thread-local value.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
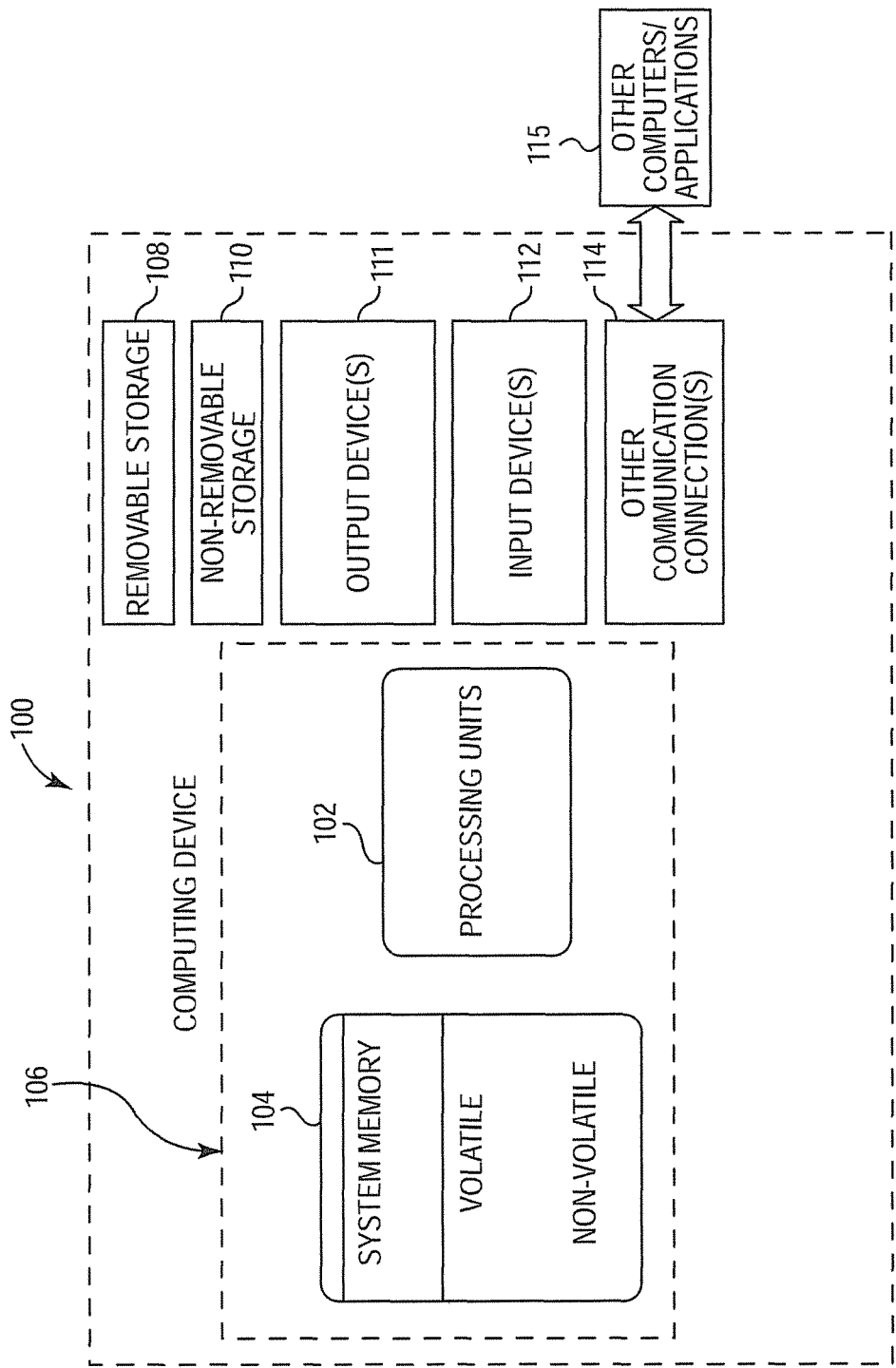
FIG. 1 is a block diagram illustrating an example of a computing device for running, hosting, or developing a hash table that can be accessed by two or more concurrent threads.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a serialized description or visualized rendering of the application.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment. An example of a managed environment can include an application framework or platform available under the trade designation .NET Framework available from Microsoft, Inc. of Redmond, Wash. U.S.A.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread-local storage, a thread identifier, and a thread context (or thread state) until the thread is scheduled. A thread context includes the thread's set of machine registers, the kernel stack, a thread environmental block, and a user stack in the in the address space of the process corresponding with the thread.

In parallel applications, threads can be concurrently executed on the processor 102. Concurrent programming for shared-memory multiprocessors can include the ability for multiple threads to access the same data. The shared-memory model is the most commonly deployed method of multithread communication. Multiple threads execute on multiple processors, multiple processor cores, or other classes of parallelism that are attached to a memory shared between the processors.

Thread-local storage is a programming construct that comes useful in multi-threaded programming. An ordinary variable represents a single location in the computer memory, and so all computation threads that access the variable will see and mutate the same value. A thread-local variable, in contrast, has one memory location for each thread, and each thread will see its own value when accessing the variable. One example scenario where thread-local variables are useful is a two-phase program where each thread first computes a partial result, and then the partial results are combined into a final answer. Such problems can often be conveniently expressed using thread-local storage.

The thread-local storage is exposed in a platform with a ThreadStatic attribute. An example of a ThreadStatic attribute in a platform such as .NET Framework is known as ThreadStaticAttribute. A ThreadStaticAttiribute constructor initializes a ThreadStaticAttribute class in C# (C-sharp) syntax such as: public ThreadStaticAttribute( ) The ThreadStaticAttribute class indicates that the value of a static field is unique for the thread. A static field marked with ThreadStaticAttribute is not shared between threads. Each executing thread has a separate instance of the field, and independently sets and gets values for that field. If the field is accessed on a different thread, it will contain a different value. The ThreadStatic attribute allows the user to annotate a static field as thread-local storage. By using a ThreadStatic attribute, the user can annotate multiple global variables as thread-local. Then, each of those global variables will have one storage slot in each thread in the process, instead of simply having one storage location in total for example.

A limitation of ThreadStatic attribute is that each thread-local variable is defined in the program source code. As a result, thread-local variables are not allocated and released dynamically. Instead, the number of thread-local variables is constant and defined in the program source code.

Figure 2:
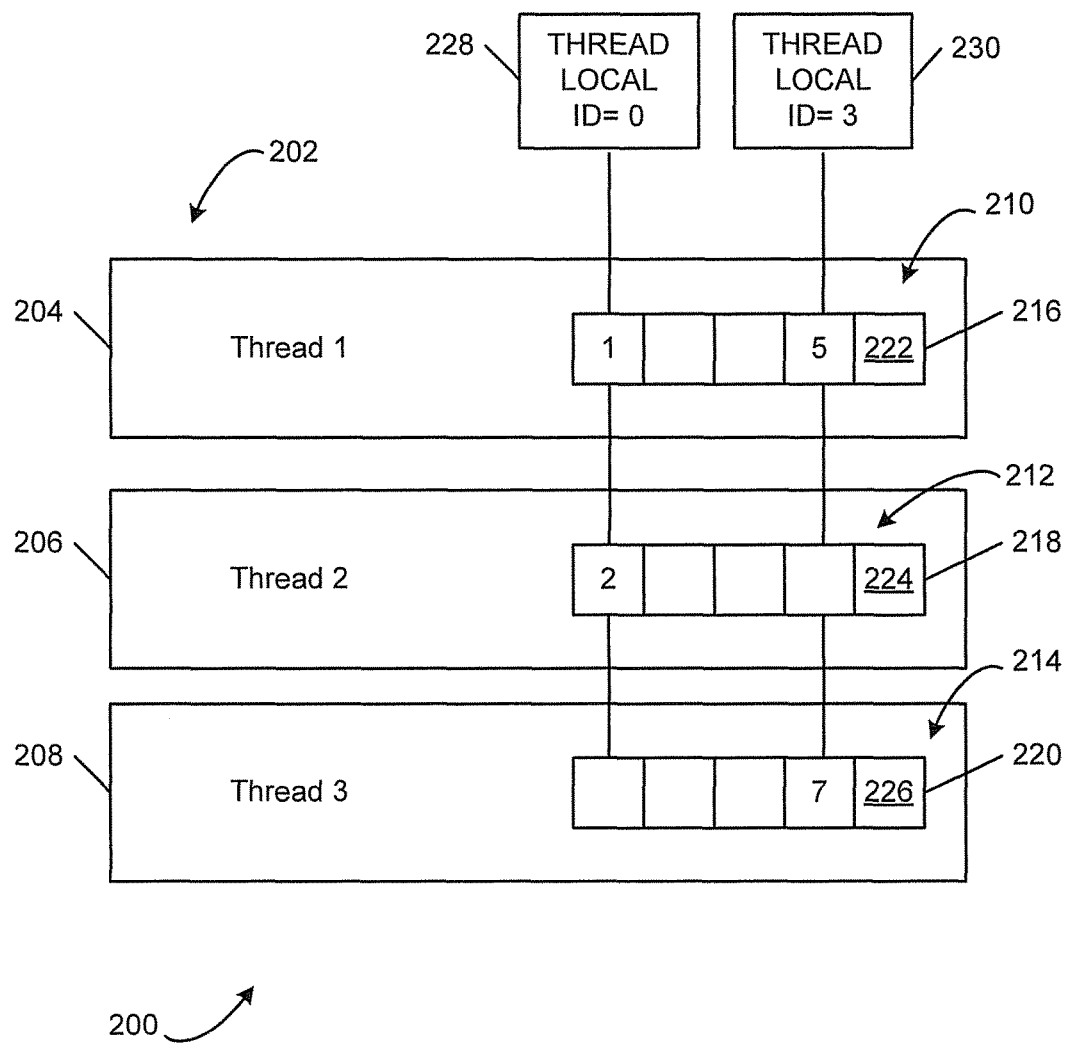
FIG. 2 is a schematic diagram illustrating an example implementation of dynamically allocated thread-local slots on top of statically allocated thread-local slots configured in the computing device of FIG. 1.

FIG. 2 illustrates an example implementation 200 of dynamically allocated thread-local slots on top of statically allocated thread-local slots in a computer memory 104 that can be operated on by the processor 102. The example implementation 200 includes two or more threads 202, such as three threads 204, 206, 208 shown each having a statically allocated thread-local slot 210, 212, 214, respectively. The instance of the statically allocated thread-local slot 210, 212, 214, in each thread 204, 206, 208 is configured to store a table 216, 218, 220, respectively. Each thread 204, 206, 208 has a different copy of the thread-local slot 210, 212, 214 so each thread will include a separate table. Each table 216, 218, 220 includes at least one slot 222, 224, 226. In the illustrations, each table 216, 218, 220 includes five slots, i.e., slots 0-4. Each slot 222, 224, 226 in the table 216, 218, 220 can correspond to a dynamically allocated thread-local value.

The example implementation 200 includes at least one dynamically-allocated ThreadLocal instance, such as ThreadLocal instances 228 and 230. ThreadLocal instance 228 has an identifier (ID) of 0, which indicates that values of ThreadLocal instance 228 are stored in slot, or location, 0 of tables 216, 218, 220. ThreadLocal instance 230 has an ID of 3, which indicates that its values are stored in location 3 of the tables 216, 218, 220. Dynamically allocated thread-local values can be implemented on top of statically allocated thread-local values. A platform such as the .NET Framework exposes GetData and SetData methods for allocating thread-local slots at runtime. The "ThreadLocal class" accomplishes the same and provides a convenient interface.

Figure 3:
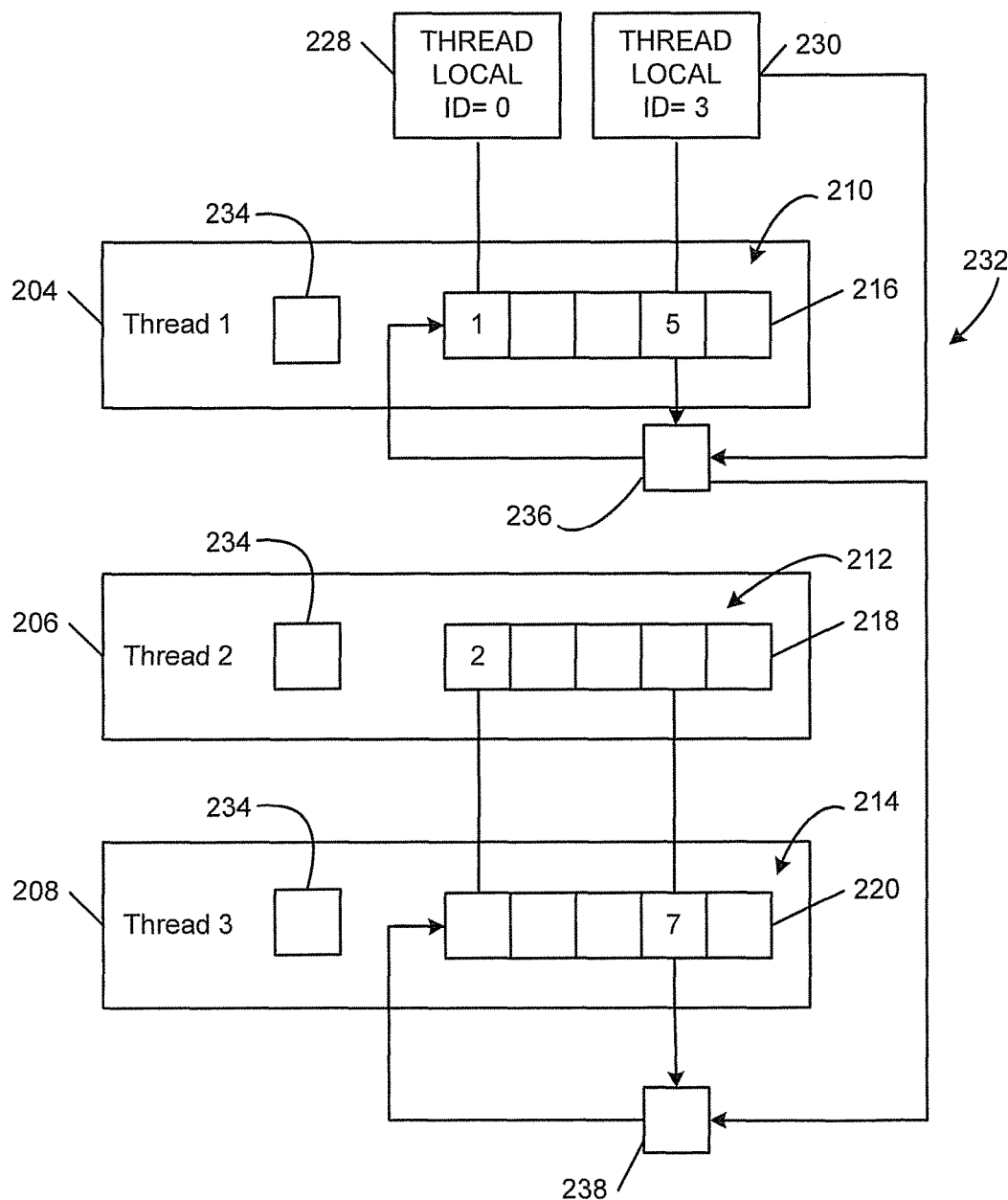
FIG. 3 is a modified schematic diagram illustrating the example implementation of FIG. 2 during cleanup after a thread-local instance is disposed.

FIG. 3 is a modified schematic diagram illustrating the example implementation 200 demonstrating an example of ThreadLocal instance 230 being removed. (By modified, FIG. 3 does not include an indication of ThreadLocal instance 228 although it can remain in the implementation 200 or even be the subject of the example.) When ThreadLocal instance 230 is removed, corresponding slots, i.e., location 3, are removed. On a platform with garbage collection, the value could be a reference to a large object. Until the reference is cleared, i.e., set to a null value, the memory occupied by the large object will not be released even if no other reference to the large object exists.

A cleanup routine is defined for ThreadLocal when ThreadLocal instance, such as ThreadLocal instance 230 is disposed. The cleanup routine can clear out the table slots associated with the disposed ThreadLocal instance 230. In order to run cleanup routine, however, a linked list 232 is used locate the tables that hold a slot associated with the cleaned up ThreadLocal instance 230, such as tables 216 and 220. Linked list 232 is added into the ThreadLocal instance 230 and enumerates over arrays that hold a value for ThreadLocal instance 230. The linked list 232 thus enables the cleanup routine to locate the tables that hold values for ThreadLocal instance 230.

While the linked list 232 solves the issue of locating the tables that hold values for the ThreadLocal instance 230, the linked list 232 by itself also introduces another issue in that the tables 216, 218, 220 themselves cannot be garbage collected when threads 204, 206, 208 are removed. If the only incoming reference to the tables 216, 220 is a statically allocated thread-local variable, the thread slots 210, 212, 214 can be automatically garbage collected after its owning thread is finished. Now that the thread slots 210, 212, 214 are also a part of the linked list 232, they cannot be garbage collected because the thread slots 210, 212, 214 have an additional incoming reference.

To address this issue, the implementation 200 provides for the back-references to a table to be removed when the corresponding thread 202 is removed with a helper cleanup routine 234 that executes when a thread, such as thread 202, is removed. The helper cleanup routine 234 can be added with a ThreadStatic field in each of the tables 216, 218, 220 that holds an object whose cleanup routine performs the desired cleanup that operates to clear all back references to the tables 216, 218, 220 when the corresponding thread 204, 206, 208 exits.

Thread-local storage can be used to enumerate all values associated with a particular ThreadLocal instance 230, i.e., the values from all threads. For example, values 5 and 7 are associated with the ThreadLocal instance 230. The example implementations in this disclosure can extend to support value enumeration.

To save the values for threads that have exited, the helper cleanup routine 233 can be modified after a thread exits. Before releasing the tables 216, 218, 220, the helper cleanup routine 234 saves the final values into nodes 236, 238 of the linked list 232. The saved values in the linked list 232 can continue to be included in the enumeration of values for the ThreadLocal instance. FIG. 4 shows the steps in the cleanup after a thread has exited.

Figure 4A:
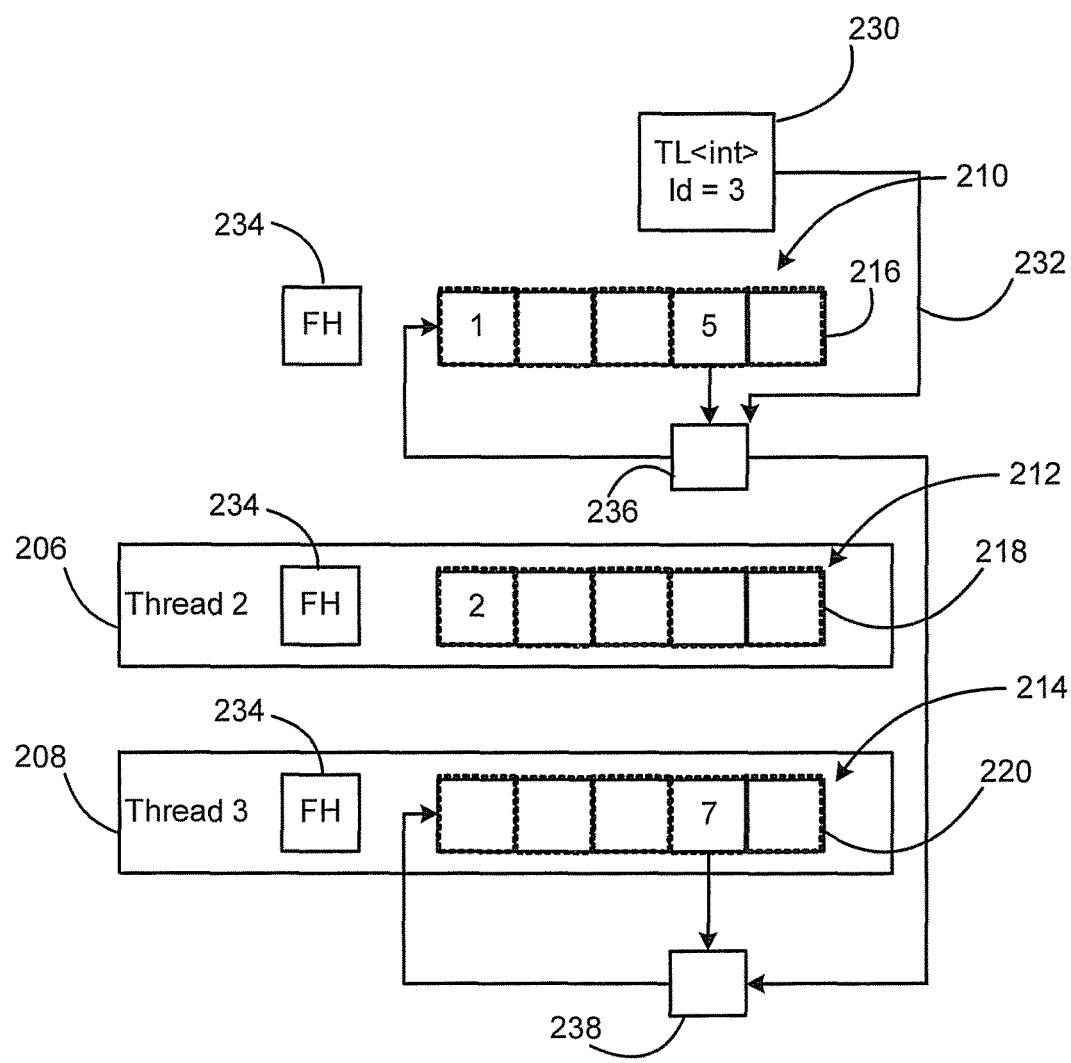
FIGS. 4A, 4B, and 4C are modified schematic diagrams illustrating the example implementation of FIG. 3 in successive stages of a cleanup after a thread exits.
Figure 4B:
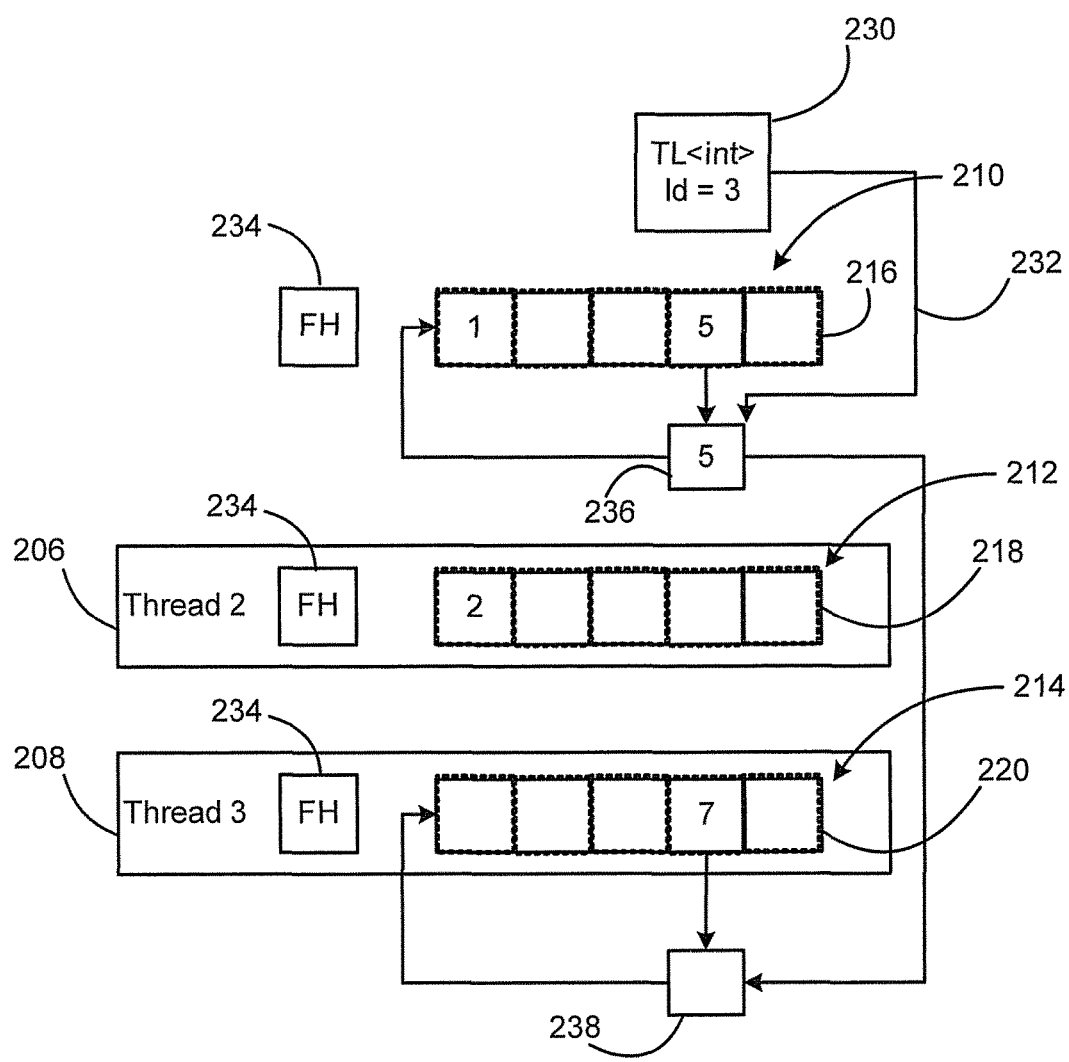
Figure 4C:
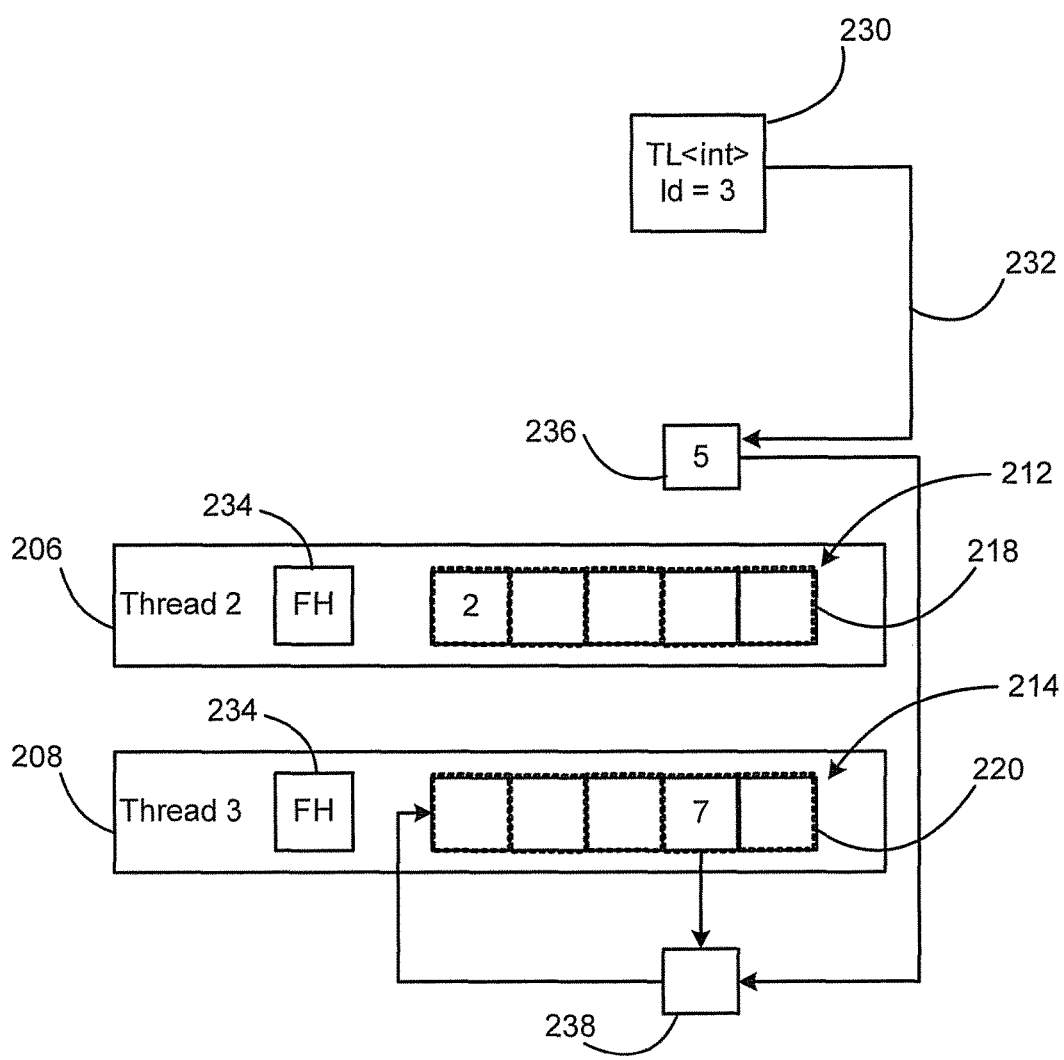

FIGS. 4A to 4C illustrate an example method of cleanup after a thread has exited from an initial state of the threads 202, 204 and 206 such as the state illustrated n FIG. 3. FIG. 4A illustrates how the linked list 232, second cleanup object 234 and table 216 remain after thread 204 has exited from the initial state illustrated FIG. 3. FIG. 4B illustrates how node 236 of the linked list 232 saves the final value of ThreadLocal instance 230. The second cleanup routine clears the back references of the table 216. Afterwards, in FIG. 4C, the table 216 is garbage collected and the value in node 236 can be enumerated.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A dynamically allocated thread storage in a computing device having a memory, comprising
   a plurality of threads included in the memory, each thread having a statically allocated thread-local slot defined in computer code, the thread-local slots each having a table including a plurality of table slots configured to store a respective thread-local value for a thread-local variable within a selected slot position for each of the plurality of tables; and
   a dynamically allocated thread-local instance included in the memory, the dynamically allocated thread-local instance having a group of allocated thread-local slots within the selected slot position to represent the respective values associated with the thread-local variable;
   the dynamically allocated thread-local variable released during runtime and, when released, indicating the allocated thread-local table slot for removal while preserving the value in the table slot of the plurality of table slots for other remaining threads of the plurality of threads.

2. The dynamically allocated thread storage of claim 1 wherein the plurality of table slots store a plurality of dynamically allocated thread-local values of a plurality of dynamically allocated thread-local instances.

3. The dynamically allocated thread storage of claim 1 wherein the dynamically allocated thread-local instance enumerates the stored value.

4. The dynamically allocated thread storage of claim 1 wherein the selected slot position is at the same slot position for each of the plurality of tables.

5. The dynamically allocated thread storage of claim 4 wherein the group includes a linked list of allocated thread local slots and the computer code includes a source code.

6. The dynamically allocated thread storage of claim 1 wherein the dynamically allocated thread-local instance includes a linked list of allocated thread local slots within the selected slot position of the plurality of tables of the thread local slots.

7. The dynamically allocated thread storage of claim 1 wherein the group is configured to indicate values during a cleanup routine.

8. The dynamically allocated thread-local storage of claim 7 wherein the group includes nodes added to each dynamically allocated thread-local value.

9. The dynamically allocated thread-local storage of claim 8 wherein the nodes store the dynamically allocated thread-local value when the thread exits.

10. A method of allocating thread storage in a memory, the method comprising:
    generating in the memory from a source code a statically allocated thread-local slot for each thread of a plurality of threads, the thread-local slots each having a table including a plurality of table slots configured to store a respective thread-local value for a thread-local variable within a selected slot position for each of the plurality of tables;
    generating in the memory a dynamically allocated thread-local instance, the dynamically allocated thread-local instance having a list of allocated thread-local slots within the selected slot position to represent the respective values associated with the thread-local variable; and
    when the allocated thread-local instance is released, indicating the allocated thread-local table slot for removal while preserving the value in the table slot of the plurality of table slots for other remaining threads of the plurality of threads.

11. The method of claim 10 wherein the selected slot position is at the same slot position for each of the plurality of tables.

12. The method of claim 11 wherein the list includes a linked list of allocated thread local slots.

13. The method of claim 10 wherein the dynamically allocated thread-local instance includes a linked list of allocated thread local slots within the selected slot position of the plurality of tables of the thread local slots.

14. The method of claim 10 comprising indicating values during a cleanup routine.

15. The method of claim 10 removing one of the plurality of thread-local instances includes removing values stored in the selected table slots.

16. A system, comprising:
    a processor; and
    memory to store executable instructions to control the processor to:
      generate from a source code a statically allocated thread-local slot for each thread of a plurality of threads, the thread-local slots each having a table including a plurality of table slots configured to store a respective thread-local value for a thread-local variable within a selected slot position for each of the plurality of tables;
      generate a dynamically allocated thread-local instance having a list of allocated thread-local slots within the selected slot position to represent the respective values associated with the thread-local variable; and
      when the allocated thread-local instance is released, indicate the allocated thread-local table slot for removal while preserving the value in the table slot of the plurality of table slots for other remaining threads of the plurality of threads.

17. The system of claim 16 wherein the plurality of table slots are configured to store a plurality of dynamically allocated thread-local values of a plurality of dynamically allocated thread-local instances.

18. The system of claim 16 wherein the dynamically allocated thread-local instance enumerates the stored value.

19. The system of claim 16 wherein the selected slot position is at the same slot position for each of the plurality of tables.

20. The system of claim 19 wherein the list includes a linked list of allocated thread local slots.

* * * * *